US012276841B2

(12) United States Patent
Akiyama et al.

(10) Patent No.: US 12,276,841 B2
(45) Date of Patent: Apr. 15, 2025

(54) OPTICAL FIBER FUSION SPLICING METHOD AND FUSION SPLICING DEVICE

(71) Applicant: SUMITOMO ELECTRIC OPTIFRONTIER CO., LTD., Yokohama (JP)

(72) Inventors: Hiroki Akiyama, Yokohama (JP); Makoto Miyamori, Yokohama (JP); Kazuyoshi Ooki, Yokohama (JP); Ryosuke Meo, Yokohama (JP); Ryuichiro Sato, Yokohama (JP); Hiroshi Takayanagi, Yokohama (JP)

(73) Assignee: SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 707 days.

(21) Appl. No.: 17/312,309

(22) PCT Filed: Dec. 13, 2019

(86) PCT No.: PCT/JP2019/049007
§ 371 (c)(1),
(2) Date: Jun. 9, 2021

(87) PCT Pub. No.: WO2020/162044
PCT Pub. Date: Aug. 13, 2020

(65) Prior Publication Data
US 2022/0026638 A1    Jan. 27, 2022

(30) Foreign Application Priority Data
Feb. 6, 2019    (JP) .................. 2019-019542

(51) Int. Cl.
*G02B 6/255*    (2006.01)

(52) U.S. Cl.
CPC ......... *G02B 6/2551* (2013.01); *G02B 6/2557* (2013.01)

(58) Field of Classification Search
CPC ........................... G02B 6/2556; G02B 6/2557
See application file for complete search history.

(56) References Cited

U.S. PATENT DOCUMENTS

| 4,749,252 A | 6/1988 | Yanagi et al. |
| 5,497,439 A | 3/1996 | Piffaretti et al. |

(Continued)

FOREIGN PATENT DOCUMENTS

| DE | 3782713 T2 | 4/1993 |
| EP | 0029383 A1 * | 11/1980 |

(Continued)

OTHER PUBLICATIONS

EP 0 029 383 A1 (Le Guen) May 27, 1981 (English language machine translation). [online] [retrieved Feb. 27, 2024]. Retrieved from: Espacenet. (Year: 1981).*

*Primary Examiner* — Erin Snelting
(74) *Attorney, Agent, or Firm* — Oliff PLC

(57) ABSTRACT

An optical fiber fusion splicing method for performing fusion splicing through positioning of optical fibers to be spliced in a V-groove is provided. The optical fiber fusion splicing method includes pressing the optical fibers placed in the V-groove relatively toward the V-groove using a clamp, varying a clamp pressure of the clamp pressing the optical fibers, and moving the optical fibers placed in the V-groove with respect to the V-groove in an axial direction.

3 Claims, 13 Drawing Sheets

(56) References Cited

U.S. PATENT DOCUMENTS

2009/0274423 A1    11/2009   Contag
2014/0131326 A1     5/2014   Sato et al.

FOREIGN PATENT DOCUMENTS

| JP | S62-210408 A | 9/1987 |
| JP | H1-224707 A | 9/1989 |
| JP | H6-347660 A | 12/1994 |
| JP | H7-151930 A | 6/1995 |
| JP | H10-239553 A | 9/1998 |
| JP | 2008-070704 A | 3/2008 |
| JP | 2013-015623 A | 1/2013 |

* cited by examiner

OPTICAL FIBER FUSION SPLICING METHOD AND FUSION SPLICING DEVICE

TECHNICAL FIELD

The present disclosure relates to an optical fiber fusion splicing method and a fusion splicing device. This application is based upon and claims the benefit of the priority from Japanese Patent Application No. 2019-19542, filed on Feb. 6, 2019, the entire contents of which are incorporated herein by reference.

BACKGROUND ART

Patent Literature 1 discloses an optical fiber fusion splicing method for performing fusion splicing through positioning of optical fibers to be spliced in a V-groove. In this method, optical fibers placed in a V-groove are moved backward. Next, the optical fibers are moved forward, and the optical fibers are placed in the V-groove again.

CITATION LIST

Patent Literature

[Patent Literature 1] Japanese Unexamined Patent Publication No. H10-239553

SUMMARY OF INVENTION

Technical Problem

According to an aspect, there is provided an optical fiber fusion splicing method for performing fusion splicing through positioning of optical fibers to be spliced in a V-groove. The optical fiber fusion splicing method includes a step of pressing the optical fibers placed in the V-groove relatively toward the V-groove using a clamp, a step of varying a clamp pressure of the clamp pressing the optical fibers, and a step of moving the optical fibers placed in the V-groove with respect to the V-groove in an axial direction.

According to another aspect, there is provided an optical fiber fusion splicing device including a V-groove configured to have optical fibers placed therein, a clamp configured to press the optical fibers placed in the V-groove relative to the V-groove, a clamp pressure varying mechanism configured to vary a clamp pressure of the clamp pressing the optical fibers, and a movement mechanism configured to move the optical fibers placed in the V-groove with respect to the V-groove in an axial direction.

DESCRIPTION OF EMBODIMENT

Technical Problem

Figure 1:
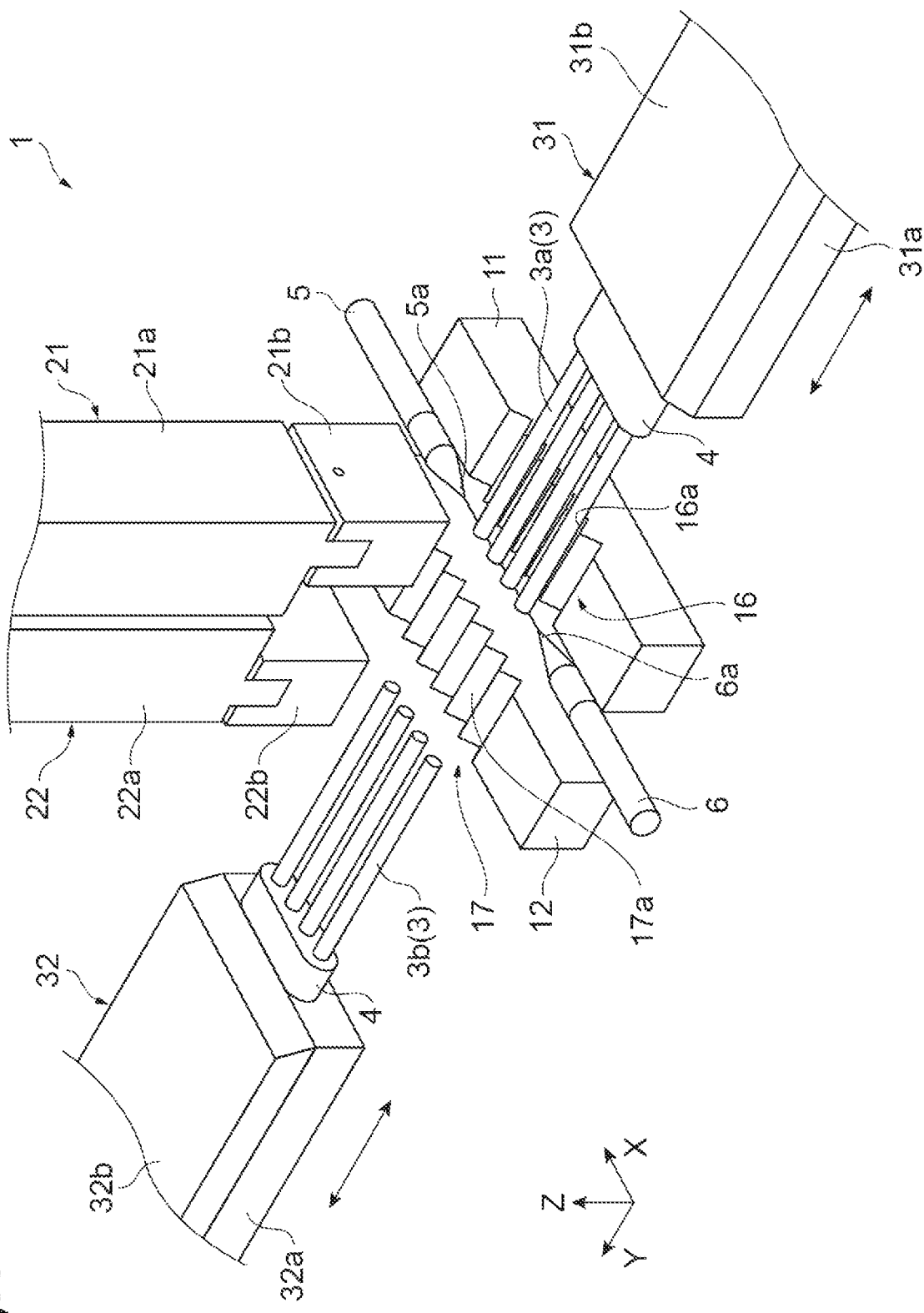
FIG. 1 is a perspective view illustrating a part of a fusion splicing device according to an example.

In a fusion splicing device, highly accurate splicing can be performed by cleaning optical fibers and a V-groove before fusion is executed. However, when waste or the like left behind during a step of cleaning optical fibers and the like adheres to the V-groove, end surfaces of a pair of fibers may not be able to be aligned perpendicularly, and thus highly accurate splicing may not be able to be performed. Hence, as disclosed in Patent Literature 1, a method of removing waste or the like in a V-groove by moving optical fibers placed in the V-groove backward and forward has been proposed. In this field, it is required to more reliably remove waste or the like in a V-groove.

According to the present disclosure, an optical fiber fusion splicing method and a fusion splicing device, in which foreign matter inside a V-groove is removed, are provided.

Description of Embodiment of Present Disclosure

First, details of an embodiment of the present disclosure will be individually enumerated and described. According to the embodiment, an optical fiber fusion splicing method for performing fusion splicing through positioning of optical fibers to be spliced in a V-groove is provided. The optical fiber fusion splicing method includes a step of pressing the optical fibers placed in the V-groove relatively toward the V-groove using a clamp, a step of varying a clamp pressure of the clamp pressing the optical fibers, and a step of moving the optical fibers placed in the V-groove with respect to the V-groove in an axial direction.

In addition, according to another embodiment, there is provided an optical fiber fusion splicing device including a V-groove configured to have optical fibers placed therein, a clamp configured to press the optical fibers placed in the V-groove relative to the V-groove, a clamp pressure varying mechanism configured to vary a clamp pressure of the clamp pressing the optical fibers, and a movement mechanism configured to move the optical fibers placed in the V-groove with respect to the V-groove in an axial direction.

In the optical fiber fusion splicing method and the fusion splicing device described above, optical fibers placed in the V-groove are pressed relative to the V-groove by the clamp, and thus the optical fibers are subjected to positioning in the V-groove. When there is foreign matter such as waste in the V-groove, it is conceivable that positioning of the optical fibers inside the V-groove may not be able to be appropriately performed. In this case, foreign matter may be moved by varying the clamp pressure and moving the optical fibers in an axial direction. Since a direction of a force acting on foreign matter differs between varying of the clamp pressure and moving of optical fibers, foreign matter may be effectively moved (removed).

In addition, the step of varying the clamp pressure and the step of moving the optical fibers in the axial direction may be performed simultaneously. In this constitution, two forces having acting directions different from each other can act on foreign matter simultaneously or consecutively.

In addition, the clamp pressure varying mechanism may be a mechanism for varying a position of the clamp with respect to the V-groove in a state of having a position of the V-groove fixed. In this constitution, since there is no need to have a mechanism for varying the position of the V-groove, a situation in which a device constitution becomes complicated is curbed.

In addition, the clamp pressure varying mechanism may be a mechanism for varying a position of the V-groove with respect to the clamp in a state of having a position of the clamp fixed. Since this constitution includes a mechanism for varying the position of the V-groove, positions of optical fibers subjected to positioning inside the V-groove can be adjusted.

Details of Embodiment of Present Disclosure

Specific examples of an optical fiber fusion splicing method and a fusion splicing device according to the present disclosure will be described below in detail with reference to the accompanying drawings. The present disclosure is not limited to the examples. The present disclosure is indicated by the claims, and it is intended to include all changes within meanings and a range equivalent to the claims. In addition, the same reference signs are applied to the same elements in description of the drawings, and duplicate description will be omitted. In the description, an XYZ orthogonal coordinate system indicated in the drawings may be referred to.

Figure 2:
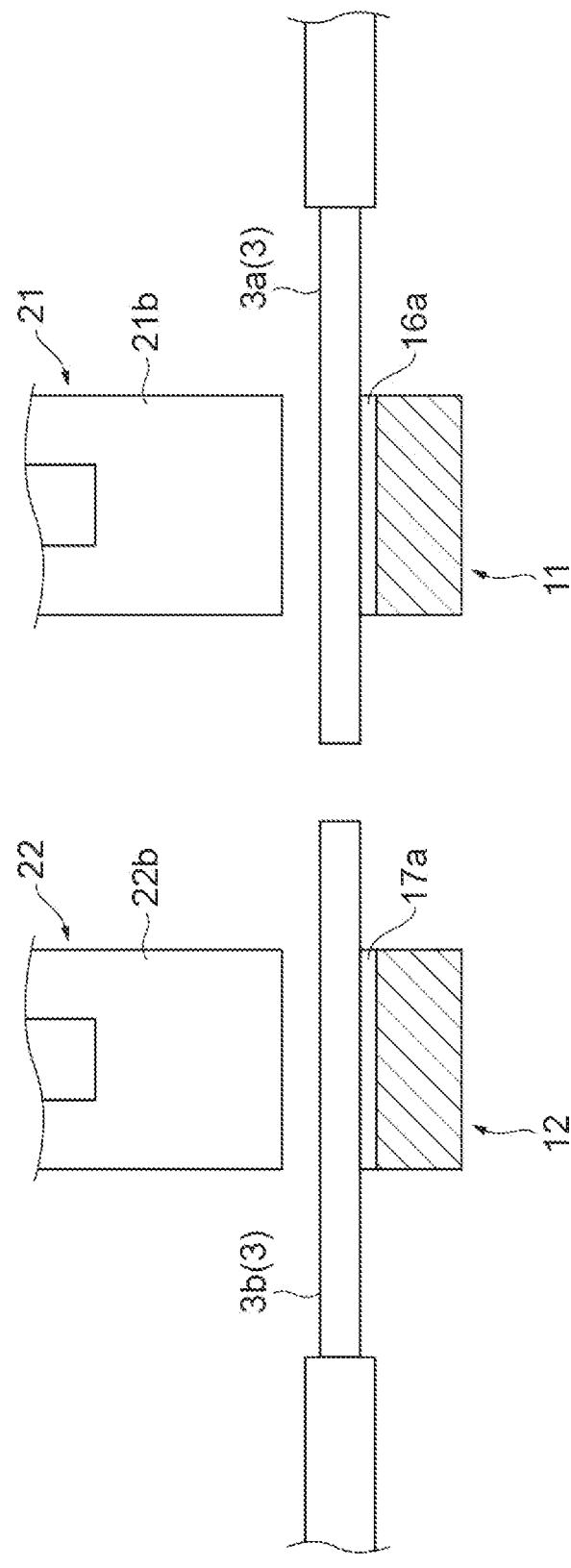
FIG. 2 is a cross-sectional view illustrating a part of the fusion splicing device.
Figure 3:
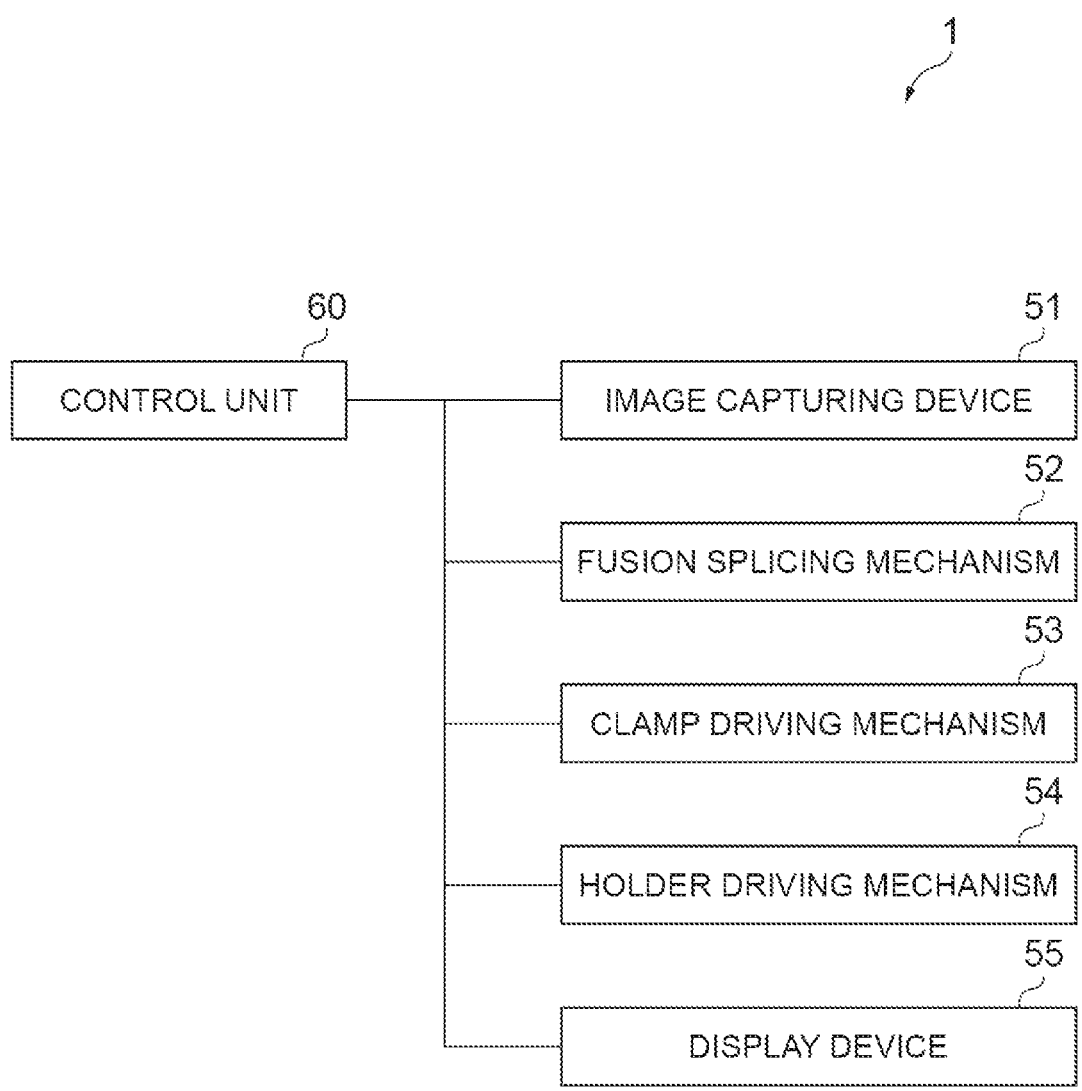
FIG. 3 is a block diagram illustrating a control system of the fusion splicing device.

FIG. 1 is a perspective view illustrating a part of an optical fiber fusion splicing device 1. FIG. 2 is an enlarged cross-sectional view illustrating a part of the fusion splicing device 1. FIG. 3 is a block diagram illustrating a control system for controlling the fusion splicing device. The fusion splicing device is a device for fusion-splicing a plurality of pairs of optical fibers (glass fibers) 3, which are arrayed with end surfaces thereof abutting each other, with each other through arc discharging. The fusion splicing device includes a pair of electrode rods 5 and 6, a pair of bases 11 and 12, a pair of clamps 21 and 22, and a pair of holders 31 and 32.

The pair of electrode rods 5 and 6 are disposed away from each other in an X direction. The electrode rod 5 and the electrode rod 6 are disposed such that a tip 5a and a tip 6a face each other. In the illustrated example, the electrode rods 5 and 6 include parts having substantially conical shapes decreasing in diameter toward the tips 5a and 6a. The plurality of pairs of optical fibers 3 may be arrayed between the pair of electrode rods 5 and 6 for causing arc discharging.

The pair of bases 11 and 12 are disposed at positions sandwiching the pair of electrode rods 5 and 6 therebetween. That is, the pair of electrode rods 5 and 6 are disposed between the base 11 and the base 12 away from each other in a Y direction. The base 11 in the illustrated example has an optical fiber disposition portion 16, and the base 12 has an optical fiber disposition portion 17. The optical fiber disposition portion 16 has a plurality of V-grooves 16a in which a plurality of optical fibers 3a are respectively disposed. The V-grooves 16a are disposed in the X direction at equal intervals and are linearly formed in the Y direction. Similarly, the optical fiber disposition portion 17 has a plurality of V-grooves 17a in which a plurality of optical fibers 3b are respectively disposed. The V-grooves 17a are disposed in the X direction at equal intervals and are linearly formed in the Y direction. The V-grooves 16a of the optical fiber disposition portion 16 and the V-grooves 17a of the optical fiber disposition portion 17 perform positioning of the plurality of pairs of optical fibers 3. In the illustrated example, each of the plurality of V-grooves 16a of the optical fiber disposition portion 16 and each of the plurality of V-grooves 17a of the optical fiber disposition portion 17 face each other. Accordingly, the optical fibers 3a subjected to positioning by the V-grooves 16a of the optical fiber disposition portion 16 and the optical fibers 3b subjected to positioning by the V-grooves 17a of the optical fiber disposition portion 17 may abut each other in a region between the optical fiber disposition portion 16 and the optical fiber disposition portion 17.

The pair of clamps 21 and 22 press the optical fibers 3 placed in the V-grooves 16a and 17a relative to the V-grooves 16a and 17a. The clamps 21 and 22 in the illustrated example include arm portions 21a and 22a and pressing portions 21b and 22b. The arm portion 21a is disposed above the optical fiber disposition portion 16, and the arm portion 22a is disposed above the optical fiber disposition portion 17. In addition, the pair of arm portions 21a and 22a are provided such that they can move in a vertical direction. For example, the arm portions 21a and 22a may have substantially rectangular columnar shapes. The pressing portion 21b is attached to a lower end of the arm portion 21a, and the pressing portion 22b is attached to a lower end of the arm portion 22a. In the present embodiment, the pressing portion 21b can move in the vertical direction (Z direction) at the lower end of the arm portion 21a, and the pressing portion 22b can move in the vertical direction (Z direction) at the lower end of the arm portion 22a. In the state of FIG. 2, the pressing portions 21b and 22b are away from the optical fibers 3a and 3b disposed in the V-grooves 16a and 17a. However, when the arm portions 21a and 22a move downward, the pressing portions 21b and 22b may press the optical fibers 3a and 3b toward the V-grooves 16a and 17a. In the present embodiment, clamp pressures of the clamps 21 and 22 can be varied. A clamp pressure may be a pressure which is received when the optical fibers 3a and 3b disposed in the V-grooves 16a and 17a are pressed from the pressing portions 21b and 22b of the clamps 21 and 22. As an example, elastic bodies such as springs biasing the pressing portions 21b and 22b downward may be disposed between the arm portions 21a and 22a and the pressing portions 21b and 22b. In this case, the clamp pressures can be controlled by controlling positions of the arm portions 21a and 22a in the vertical direction.

The holders 31 and 32 hold the optical fibers 3. In the illustrated example, tape cores 4 including the plurality of optical fibers 3 are held by the holders 31 and 32. For example, the holders 31 and 32 have holder main bodies 31a and 32a which have recessed portions for accommodating the tape cores 4, and lids 31b and 32b which are attached to the holder main bodies 31a and 32a. When the lids 31b and 32b are closed in a state in which the tape cores 4 are accommodated in the holder main bodies 31a and 32a, the tape cores 4 are held by the holders 31 and 32. The holders 31 and 32 can move in a direction extending in axial directions of the held optical fibers 3. That is, the holders 31 and 32 can move in an extending direction (that is, the Y direction) of the V-grooves 16a and 17a. When the holders 31 and 32 holding the optical fibers 3 move, the held optical fibers 3 may move forward and move backward along the V-grooves 16a and 17a. Forward movement denotes that the held optical fibers 3a and 3b move in a direction in which they approach each other. In addition, backward movement denotes that the held optical fibers 3a and 3b move in a direction in which they are separated from each other.

As illustrated in FIG. 3, the fusion splicing device includes an image capturing device 51, a fusion splicing mechanism 52, a clamp driving mechanism 53, a holder driving mechanism 54, and a display device 55. The image capturing device 51, the fusion splicing mechanism 52, the clamp driving mechanism 53, the holder driving mechanism 54, and the display device 55 are controlled by a control unit 60. The control unit 60 may be a computer including a central processing unit (CPU), a random access memory (RAM), a read only memory (ROM), a communication module, a hard disk, and the like.

For example, the image capturing device 51 is constituted to include a pair of cameras. The pair of cameras capture images of end portions of the pair of optical fibers 3a and 3b placed in the V-grooves 16a and 17a. For example, image capturing directions of the pair of cameras may be directions intersecting the axial directions of the optical fibers 3a and 3b placed in the V-grooves 16a and 17a. In addition, the image capturing directions of the pair of cameras may intersect each other. As an example, the image capturing directions of the pair of cameras are directions orthogonal to the axial directions of the optical fibers 3a and 3b placed in the V-grooves 16a and 17a. In addition, the image capturing directions of the pair of cameras are orthogonal to each other. Positions of optical fibers can be identified by capturing images of the optical fibers in two directions different from each other using the pair of cameras.

The fusion splicing mechanism 52 is a mechanism for fusion-splicing the end portions of the pair of optical fibers 3a and 3b and includes the pair of electrode rods 5 and 6. The clamp driving mechanism 53 includes an actuator for moving the arm portions 21a and 22a constituting the clamps 21 and 22 in the vertical direction. The holder driving mechanism 54 includes an actuator for moving the holders 31 and 32 in a direction extending in the axial directions of the optical fibers 3a and 3b. The display device 55 can display an image captured by the image capturing device 51.

The control unit 60 controls the image capturing device 51 to acquire an image captured by the image capturing device 51. For example, the display device 55 may display an acquired image. The control unit 60 determines a state of the pair of optical fibers 3a and 3b by performing image processing on an acquired image. In addition, the control unit 60 controls the fusion splicing mechanism 52 to cause arc discharging between the pair of electrode rods 5 and 6. Moreover, the control unit 60 controls the clamp driving mechanism (clamp pressure control mechanism) 53 to move the arm portions 21a and 22a of the clamps 21 and 22 in the vertical direction. Due to control of the control unit 60, the clamps 21 and 22 can vary pressing states of the optical fibers 3a and 3b disposed in the V-grooves 16a and 17a. In addition, the control unit 60 controls the holder driving mechanism 54 to control positions of the holders 31 and 32 in the Y direction. Due to control of the control unit 60, the holders 31 and 32 move forward and move backward and cause the optical fibers 3a and 3b held by the holders 31 and 32 to move forward and move backward.

Figure 4:
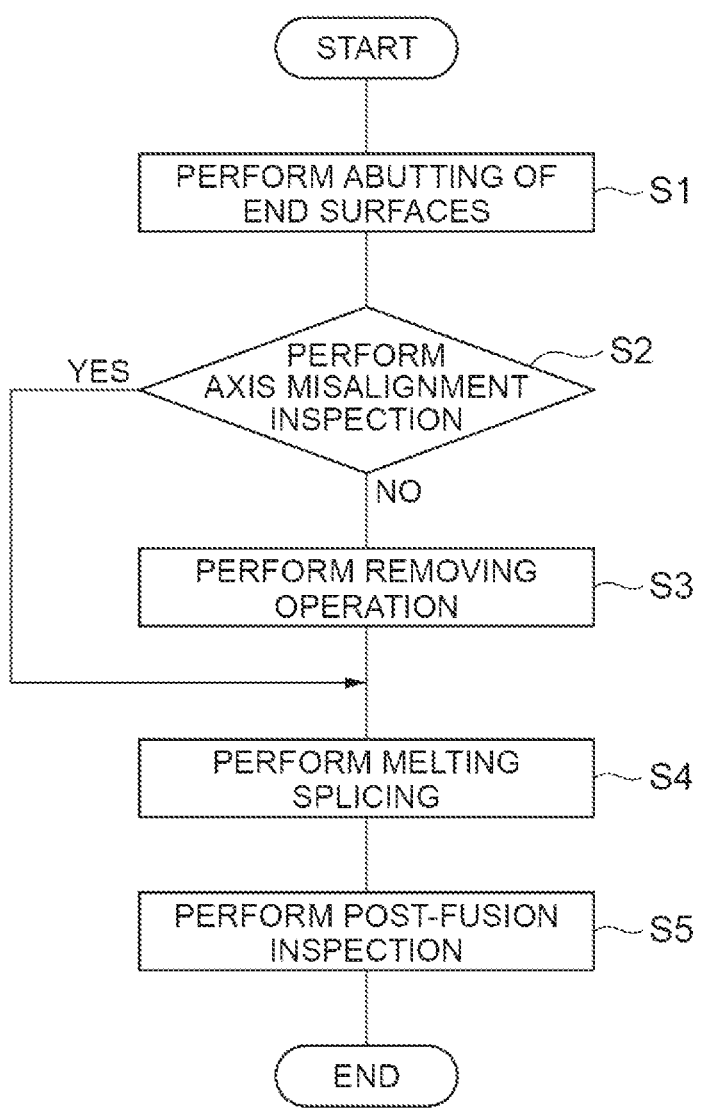
FIG. 4 is a flowchart illustrating an example of operation of the fusion splicing device.

Subsequently, operation of the fusion splicing device will be described. FIG. 4 is a flowchart illustrating an example of operation of the fusion splicing device. When fusion splicing of the optical fibers 3a and 3b is performed using the fusion splicing device, first, the optical fibers 3a and 3b are set in the holders 31 and 32 by a user. In a state in which the optical fibers 3a and 3b are set in the holders 31 and 32, the optical fibers 3a and 3b are pressed by the pressing portions 21b and 22b of the clamps 21 and 22 in a state of being placed in the V-grooves 16a and 17a. When the optical fibers 3a and 3b are set in the holders 31 and 32, the holder driving mechanism 54 is driven by the control unit 60, and the holders 31 and 32 move in the axial directions of the optical fibers 3a and 3b. In this case, tips of the optical fibers 3a and 3b set in the holders 31 and 32 move into an image capturing range of the image capturing device 51, and abutting of end surfaces thereof is executed (Step S1). In this step, a gap between the end surfaces of the optical fibers 3a and 3b is adjusted such that it becomes a predetermined gap suitable for fusion splicing of the optical fibers 3a and 3b. That is, the holders 31 and 32 move such that the end surfaces of the optical fibers 3a and 3b approach each other.

Figure 5:
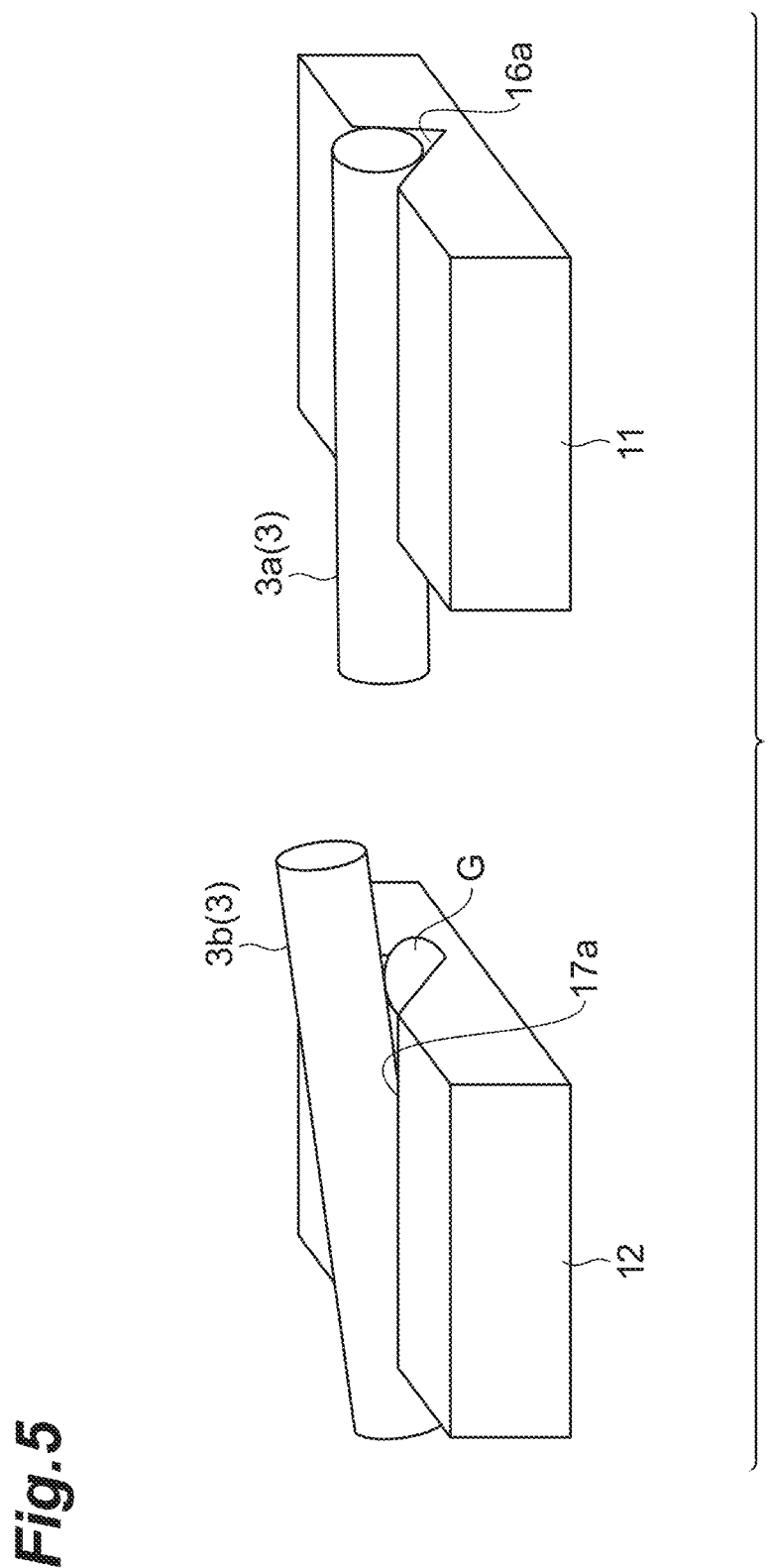
FIG. 5 is a view illustrating a state in which foreign matter is present in a V-groove of the fusion splicing device.
Figure 6:
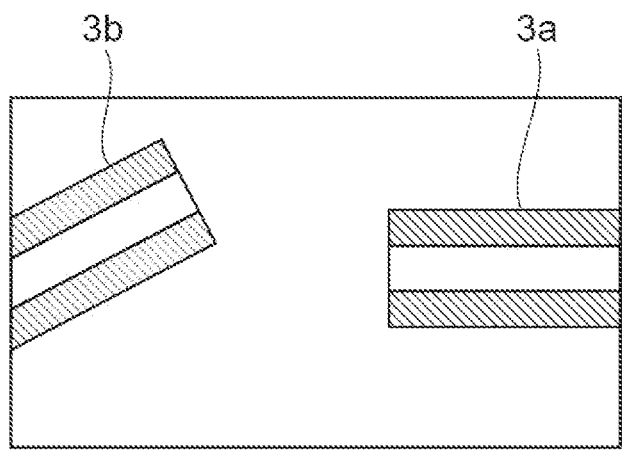
FIG. 6 is a view schematically illustrating an example of an image acquired by an image capturing device of the fusion splicing device.
Figure 7:
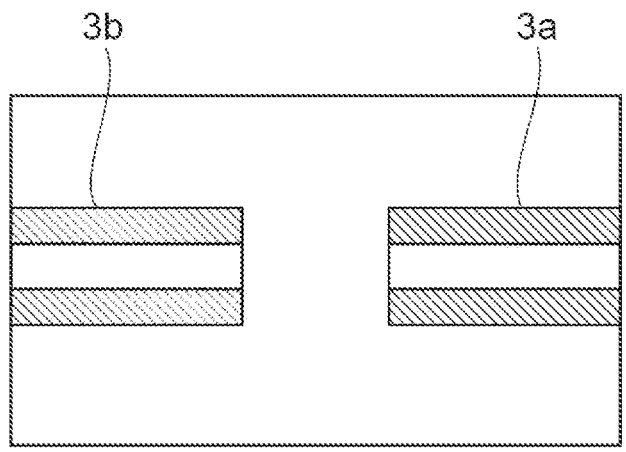
FIG. 7 is a view schematically illustrating another example of an image acquired by the image capturing device of the fusion splicing device.

Next, axis misalignment inspection is executed (Step S2). In this step, on the basis of an image captured by the image capturing device 51, it is determined whether or not an amount of misalignment between positions of axial cores of the pair of optical fibers 3a and 3b is equal to or smaller than a predetermined amount. FIG. 5 is a view illustrating an example of the optical fibers 3a and 3b when foreign matter G such as waste is present in the V-groove 17a on one side. FIG. 6 schematically illustrates an image captured by the image capturing device 51 at the time of the state of FIG. 5. FIG. 7 schematically illustrates an image captured by the image capturing device 51 when the axial cores of the pair of optical fibers 3a and 3b coincide with each other. In FIG. 5, a flange is omitted. In addition, in FIGS. 6 and 7, hatching is applied to parts of claddings covering areas around cores of the optical fibers.

As illustrated in FIG. 5, when the foreign matter G is present inside the V-groove 17a, the optical fiber 3b may not be subjected to positioning in the V-groove 17a and the tip side of the optical fiber 3b may tilt upward. In this case, as illustrated in FIG. 6, in an image captured by the image capturing device 51, misalignment occurs between the direction of the axial core of the optical fiber 3a on one side and the direction of the axial core of the optical fiber 3b on the other side. As an example, the amount of misalignment may be an amount of misalignment between the positions of the cores of the optical fibers in the vertical direction of the sheet in FIG. 6. For example, the positions of the cores may be identified on the basis of a brightness value of an image. In the axis misalignment inspection of Step S2, when it is determined that the amount of misalignment is larger than the predetermined amount, that is, when it is determined that the amount of misalignment is not equal to or smaller than the predetermined amount, the process proceeds to the removing operation of Step S3.

On the other hand, as illustrated in FIG. 7 when the amount of misalignment between the pair of optical fibers 3a and 3b is equal to or smaller than the predetermined amount, discharging occurs between the pair of electrode rods 5 and 6, and the optical fibers 3a and 3b are heated and melting-spliced together (Step S4). Further, post-fusion inspection is performed on the basis of a captured image of the melting-spliced optical fibers 3a and 3b (Step S5).

Figure 8:
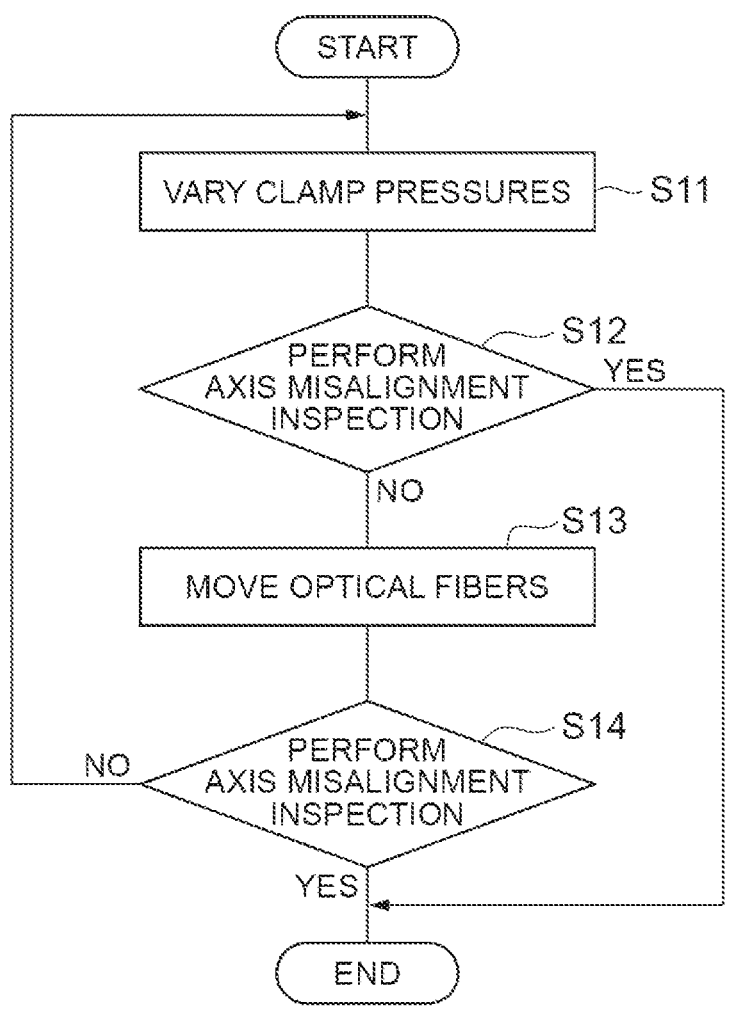
FIG. 8 is a flowchart illustrating an example of a removing operation performed by the fusion splicing device.

FIG. 8 is a flowchart illustrating an example of a removing operation. In the removing operation illustrated in FIG. 8, first, the clamp pressures are varied (Step S11). In this step, as an example, the control unit 60 controls the clamp driving mechanism 53 such that the clamp pressures of the clamps 21 and 22 temporarily vary. For example, the clamps 21 and 22 may be raised such that the optical fibers 3a and 3b pressed toward the V-grooves 16a and 17a are released, and thereafter, the clamp pressures may be returned to the original pressures by lowering the clamps 21 and 22. In addition, the clamp pressures of the clamps 21 and 22 may be varied such that the optical fibers 3a and 3b disposed in the V-grooves 16a and 17a are pressed toward the V-grooves 16a and 17a with greater forces, and thereafter, the clamp pressures of the clamps 21 and 22 may be returned to the original pressures.

Next, axis misalignment inspection is executed again (Step S12). This axis misalignment inspection is similar to the axis misalignment inspection of Step S2. If there is no problem in this axis misalignment inspection, that is, when it is determined that the amount of misalignment is equal to or smaller than the predetermined amount, the removing operation ends, and the process proceeds to Step S4. On the other hand, in the axis misalignment inspection of Step S12, when it is determined that the amount of misalignment is larger than the predetermined amount, that is, when it is determined that the amount of misalignment is not equal to or smaller than the predetermined amount, the process proceeds to Step S13.

In Step S13, the control unit 60 controls the holder driving mechanism 54 to move the optical fibers 3a and 3b placed in the V-grooves 16a and 17a in the axial direction (the Y direction in the illustrated example). For example, the optical fibers 3a and 3b are moved backward. Thereafter, the optical fibers 3a and 3b are moved forward, and the optical fibers are returned to the original positions.

Next, axis misalignment inspection is executed again (Step S14). This axis misalignment inspection is similar to the axis misalignment inspection of Step S2. For this reason, if there is no problem in this axis misalignment inspection, that is, when it is determined that the amount of misalignment is equal to or smaller than the predetermined amount, the removing operation ends, and the process proceeds to Step S4. On the other hand, in the axis misalignment inspection of Step S14, when it is determined that the amount of misalignment is larger than the predetermined amount, that is, when it is determined that the amount of misalignment is not equal to or smaller than the predetermined amount, the process returns to Step S11. Even if the removing operation of Step S3 is executed a plurality of times (for example, twice), when a problem occurs in the axis misalignment inspection, the display device 55 may display an error message, and processing may end.

Figure 9:
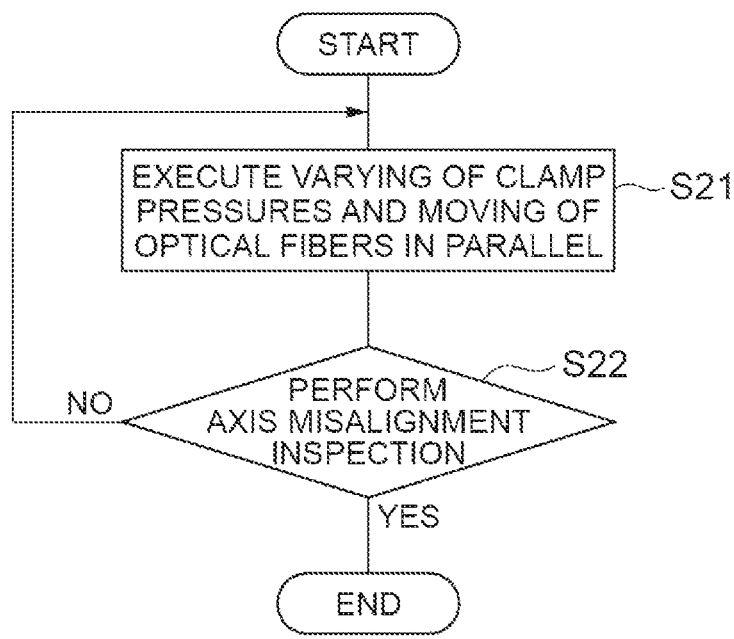
FIG. 9 is a flowchart illustrating another example of a removing operation performed by the fusion splicing device.

FIG. 9 is a flowchart illustrating another example of a removing operation. In the present embodiment, the removing operation illustrated in FIG. 9 may be executed as the removing operation of Step S3. In the removing operation illustrated in FIG. 9, varying of the clamp pressures and moving of the optical fibers 3a and 3b are executed in parallel (Step S21). For example, in the removing operation, the optical fibers 3a and 3b may be moved backward in a state in which the clamp pressures are increased. Thereafter, the optical fibers 3a and 3b may be moved forward while maintaining the state in which the clamp pressures are increased, and the optical fibers may be returned to the original positions. As an example, in backward movement and forward movement of the optical fibers 3a and 3b, the optical fibers 3a and 3b may be moved in a forward/rearward direction by approximately 0.5 mm.

In addition, as another example, in the removing operation, the optical fibers 3a and 3b may be moved backward without varying the clamp pressures. Thereafter, the optical fibers 3a and 3b may be moved forward in a state in which the clamp pressures are increased. In this manner, in the removing operation of Step S21, a state in which the clamp pressures are increased, a state in which the clamp pressures are not varied, a state in which the optical fibers are released (a state in which the clamp pressures are reduced, and the clamp pressures are zero), and backward movement and forward movement of the optical fibers 3a and 3b can be suitably combined. Moreover, magnitudes of the clamp pressures may be varied during backward movement (or forward movement) of the optical fibers 3a and 3b. As an example, during backward movement (or forward movement) of the optical fibers 3a and 3b, the state in which the clamp pressures are increased and the state in which the clamp pressures are reduced may be repeated.

Next, axis misalignment inspection is executed again (Step S22). This axis misalignment inspection is similar to the axis misalignment inspection of Step S2. For this reason, if there is no problem in this axis misalignment inspection, that is, when it is determined that the amount of misalignment is equal to or smaller than the predetermined amount, the removing operation ends, and the process proceeds to Step S4. On the other hand, in the axis misalignment inspection of Step S22, when it is determined that the amount of misalignment is larger than the predetermined amount, that is, when it is determined that the amount of misalignment is not equal to or smaller than the predetermined amount, the process returns to Step S21.

In the fusion splicing device described above, the optical fibers 3 placed in the V-grooves 16a and 17a are pressed relative to the V-grooves 16a and 17a by the clamps 21 and 22, and thus the optical fibers 3 are subjected to positioning in the V-grooves 16a and 17a. When there is the foreign matter G such as waste in the V-grooves 16a and 17a, it is conceivable that positioning of the optical fibers 3 inside the V-grooves 16a and 17a may not be able to be appropriately performed. In this case, it is conceivable that the foreign matter G and the optical fibers 3 have come into contact with each other. Therefore, the foreign matter G may be moved by varying the clamp pressures and moving the optical fibers 3 in an axial direction. When the clamp pressures are varied, the magnitude of a force acting on the foreign matter G inside the V-groove 16a or 17a in the vertical direction may vary. In addition, when the optical fibers 3 are moved in the axial direction, the magnitude of a force acting on the foreign matter G inside the V-groove 16a or 17a in the forward/rearward direction may vary. In this manner, since the direction of a force acting on the foreign matter G differs between varying of the clamp pressures and moving of the optical fibers 3, the foreign matter may be effectively moved (removed).

In addition, as illustrated in FIG. 9, a step of varying the clamp pressures and a step of moving the optical fibers 3 in the axial direction may be performed simultaneously. In this constitution, two forces having acting directions different from each other can act on the foreign matter G simultaneously or consecutively. As in the embodiment, a force may act on the foreign matter G obliquely upward or obliquely downward by compounding a force acting in the vertical direction and a force acting in the forward/rearward direction.

In addition, in the present embodiment, the clamp pressures are varied by moving the arm portions 21a and 22a of the clamps 21 and 22 in the vertical direction. In this constitution, since there is no need to have a mechanism for varying positions of the V-grooves in the vertical direction, a situation in which the device constitution becomes complicated is curbed.

Second Embodiment

Figure 10:
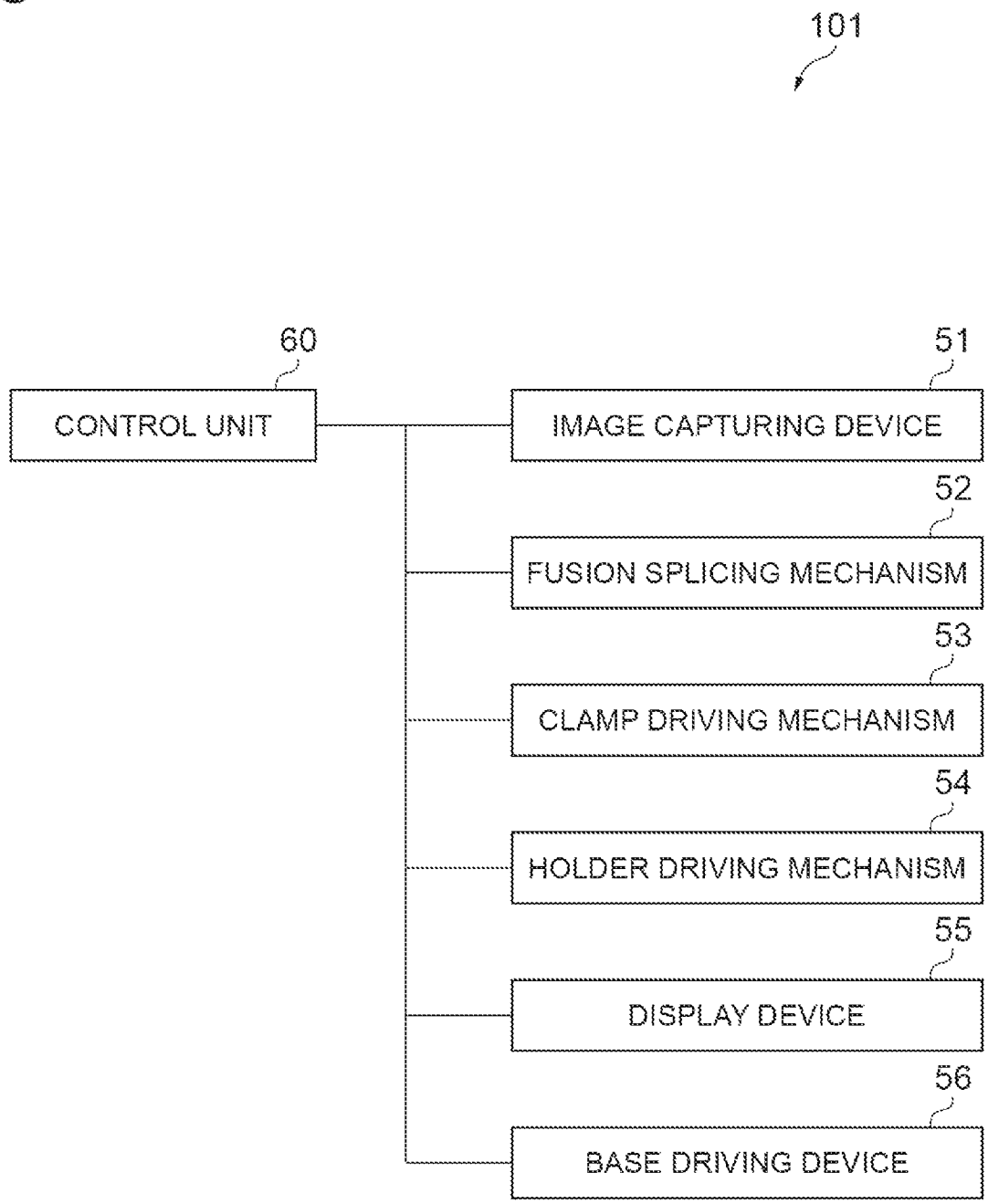
FIG. 10 is a block diagram illustrating a control system of the fusion splicing device according to another example.

As illustrated in FIG. 10, a fusion splicing device of a second embodiment further includes a base driving mechanism 56 in addition to the image capturing device 51, the fusion splicing mechanism 52, the clamp driving mechanism 53, the holder driving mechanism 54, and the display device 55. Since the image capturing device 51, the fusion splicing mechanism 52, the clamp driving mechanism 53, the holder driving mechanism 54, and the display device 55 have constitutions similar to those of the first embodiment, description thereof will be omitted. In the second embodiment, the clamp driving mechanism 53 may not be able to execute varying of the clamp pressures. In addition, since the basic constitution of the fusion splicing device is common to the first embodiment and the second embodiment, FIG. 1 is also referred to in description of the second embodiment.

In the present embodiment, each of the pair of bases 11 and 12 is constituted to be able to move in the vertical direction. The base driving mechanism 56 includes actuators for respectively moving the bases 11 and 12 in the vertical direction. The control unit 60 can control the positions of the bases 11 and 12 in the vertical direction by controlling the base driving mechanism 56. In this case, the pair of optical fibers 3a and 3b can be aligned with each other by controlling the positions of the bases 11 and 12 in the vertical direction. In addition, the clamp pressures can be controlled (varied) by controlling the positions of the bases 11 and 12 in the vertical direction. That is, in a case of predetermined clamp pressures when the bases 11 and 12 are at reference positions in the vertical direction, the clamp pressures can be increased by moving the bases 11 and 12 upward. In addition, in a case of the predetermined clamp pressures when the bases 11 and 12 are at the reference positions in the vertical direction, the clamp pressures can be reduced by moving the bases 11 and 12 downward.

Figure 11:
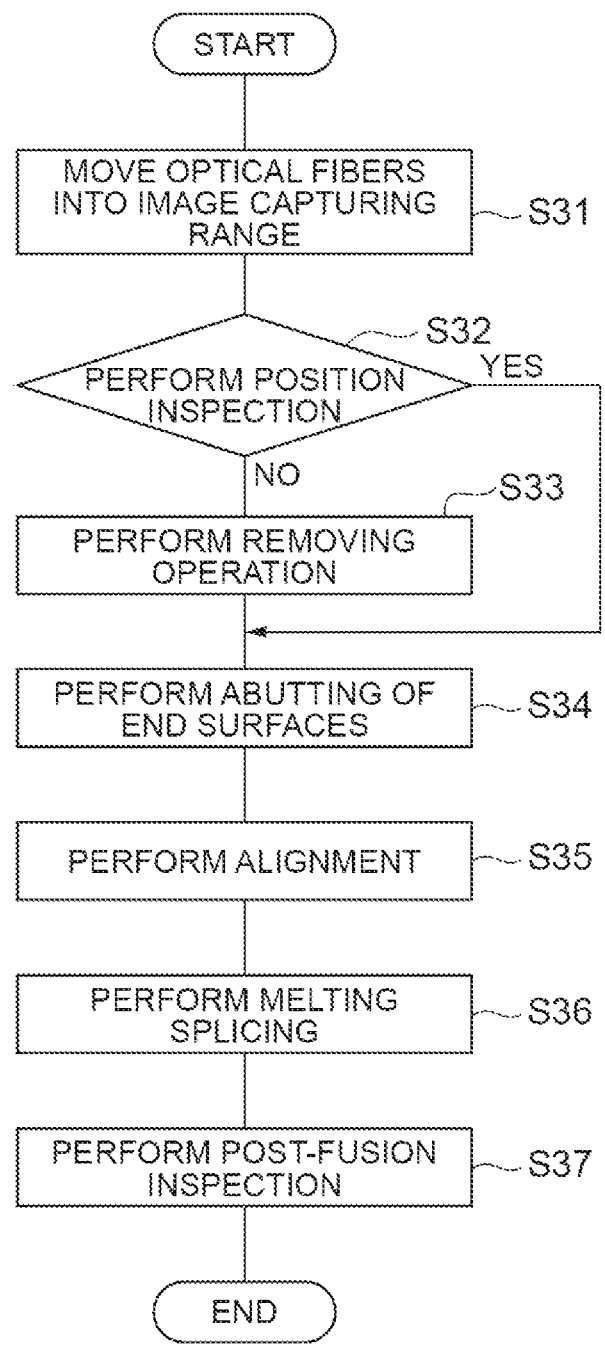
FIG. 11 is a flowchart illustrating another example of operation of the fusion splicing device.

Subsequently, operation of the fusion splicing device in the present embodiment will be described. FIG. 11 is a flowchart illustrating another example of operation of the fusion splicing device of the second embodiment. When fusion splicing of the optical fibers 3a and 3b is performed using the fusion splicing device, first, the optical fibers 3a and 3b are set in the holders 31 and 32 by a user. In a state in which the optical fibers 3a and 3b are set in the holders 31 and 32, the optical fibers 3a and 3b are pressed by the pressing portions 21b and 22b of the clamps 21 and 22 in a state of being placed in the V-grooves 16a and 17a. When the optical fibers 3a and 3b are set in the holders 31 and 32, the holder driving mechanism 54 is driven by the control unit 60, and the holders 31 and 32 move in the axial directions of the optical fibers 3a and 3b. In this case, the holders 31 and 32 are moved such that the tips of the optical fibers 3a and 3b set in the holders 31 and 32 move into the image capturing range of the image capturing device 51 (Step S31).

Next, position inspection is executed (Step S32). A method of position inspection is similar to the axis misalignment inspection of Step S2 in the first embodiment. In this position inspection, when it is determined that the tips of the optical fibers 3a and 3b are not positioned in a predetermined range, the process proceeds to the removing operation of Step S33.

On the other hand, when it is determined that the tips of the optical fibers 3a and 3b are positioned in the predetermined range, abutting of the end surfaces thereof is executed subsequently (Step S34). In this step, the gap between the end surfaces of the optical fibers 3a and 3b is adjusted such that it has a predetermined distance suitable for fusion splicing of the optical fibers 3a and 3b. That is, the holders 31 and 32 move such that the end surfaces of the optical fibers 3a and 3b approach each other.

Next, alignment is executed (Step S35). In alignment, the control unit 60 controls the base driving mechanism 56 to move at least one of the bases 11 and 12 in the vertical direction and to cause the positions of the cores of the pair of optical fibers 3a and 3b to coincide with each other at predetermined accuracy. For example, in alignment, the positions of the cores of the pair of optical fibers 3a and 3b are decided on the basis of an image captured by the image capturing device 51. Next, discharging occurs between the pair of electrode rods 5 and 6, and the optical fibers are heated and melting-spliced together (Step S36). Further, post-fusion inspection is performed on the basis of a captured image of the melting-spliced optical fibers 3a and 3b (Step S37).

Figure 12:
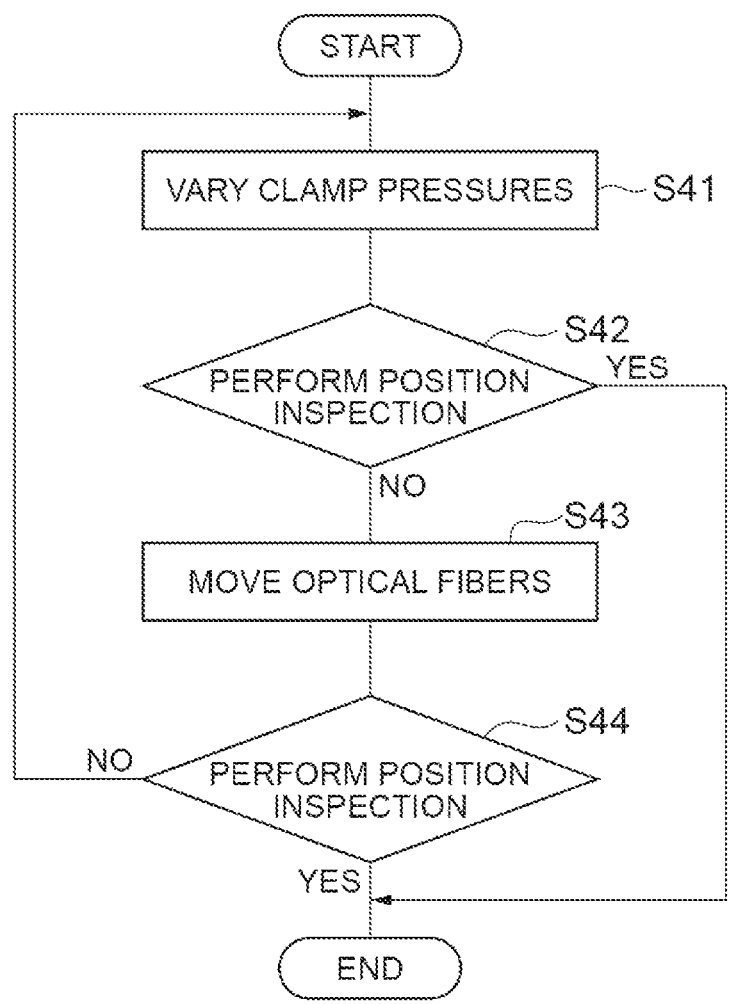
FIG. 12 is a flowchart illustrating an example of a removing operation performed by the fusion splicing device.

FIG. 12 is a flowchart illustrating an example of a removing operation of Step S33. In the removing operation illustrated in FIG. 12, first, the clamp pressures are varied (Step S41). In this step, as an example, the control unit 60 controls the base driving mechanism 56 such that the clamp pressures temporarily vary. For example, the control unit 60 controls the base driving mechanism 56 to move the bases 11 and 12 downward and to release the optical fibers 3a and 3b relatively pressed toward the V-grooves 16a and 17a. Thereafter, the clamp pressures may be returned to the original pressures by moving the bases 11 and 12 upward. In addition, the clamp pressures may be varied by moving the bases 11 and 12 upward such that the optical fibers 3a and 3b disposed in the V-grooves 16a and 17a are pressed toward the V-grooves 16a and 17a with greater forces, and thereafter, the clamp pressures may be returned to the original pressures by moving the bases 11 and 12 downward.

Next, position inspection is executed again (Step S42). This position inspection is similar to the position inspection of Step S32. If there is no problem in this position inspection, that is, when it is determined that the tips of the optical fibers 3a and 3b are positioned in the predetermined range, the removing operation ends, and the process proceeds to Step S34. On the other hand, in the position inspection of Step S42, when it is determined that the tips of the optical fibers 3a and 3b are not positioned in the predetermined range, the process proceeds to Step S43. In Step S43, the control unit 60 controls the holder driving mechanism 54 to move the optical fibers 3a and 3b placed in the V-grooves 16a and 17a in the axial direction. For example, the optical fibers 3a and 3b are moved backward. Thereafter, the optical fibers 3a and 3b are moved forward, and the optical fibers are returned to the original positions.

Next, position inspection is executed again (Step S44). This position inspection is similar to the position inspection of Step S32. If there is no problem in this position inspection, that is, when it is determined that the tips of the optical fibers 3a and 3b are positioned in the predetermined range, the removing operation ends, and the process proceeds to Step S34. On the other hand, in the position inspection of Step S44, when it is determined that the tips of the optical fibers 3a and 3b are not positioned in the predetermined range, the process returns to Step S41. Even if the removing operation of Step S33 is executed a plurality of times (for example, twice), when a problem occurs in the position inspection, the display device 55 may display an error message, and processing may end.

Figure 13:
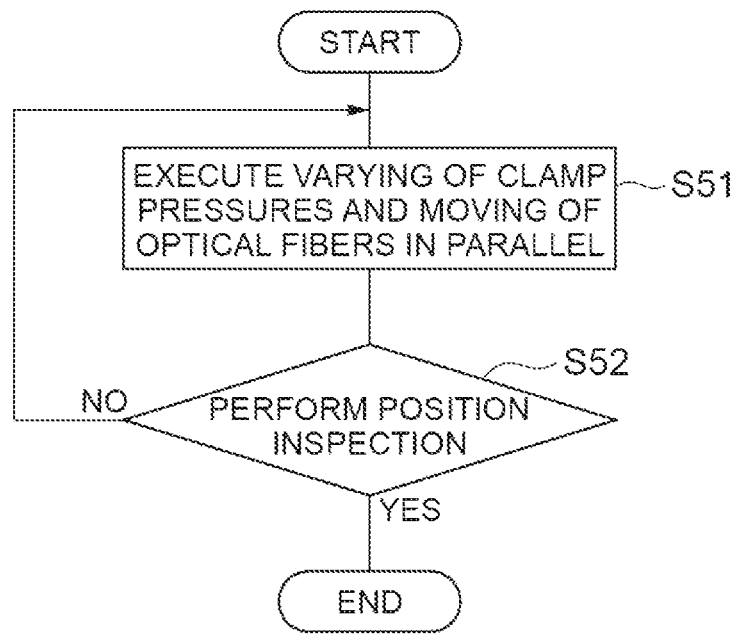
FIG. 13 is a flowchart illustrating another example of a removing operation performed by the fusion splicing device.

FIG. 13 is a flowchart illustrating another example of a removing operation. In the present embodiment, the removing operation illustrated in FIG. 13 may be executed as the removing operation of Step S33. In the removing operation illustrated in FIG. 13, varying of the clamp pressures and moving of the optical fibers 3a and 3b are executed in parallel (Step S51). For example, in the removing operation, the clamp pressures are increased by raising the positions of the bases 11 and 12. Further, the optical fibers 3a and 3b may be moved backward in a state in which the clamp pressures are increased. Thereafter, the optical fibers 3a and 3b may be moved forward while maintaining the state in which the clamp pressures are increased, and the optical fibers may be returned to the original positions. As an example, in backward movement and forward movement of the optical fibers 3a and 3b, the optical fibers 3a and 3b may be moved in the forward/rearward direction by approximately 0.5 mm.

In addition, as another example, in the removing operation, the optical fibers 3a and 3b may be moved backward without varying the clamp pressures. Thereafter, the optical fibers 3a and 3b may be moved forward in a state in which the clamp pressures are increased by raising the positions of the bases 11 and 12. In this manner, in the removing operation of Step S51, a state in which the clamp pressures are increased, a state in which the clamp pressures are not varied, a state in which the optical fibers are released, and backward movement and forward movement of the optical fibers 3a and 3b can be suitably combined. Moreover, magnitudes of the clamp pressures may be varied during backward movement (or forward movement) of the optical fibers 3a and 3b. As an example, during backward movement (or forward movement) of the optical fibers 3a and 3b, the state in which the clamp pressures are increased and the state in which the clamp pressures are reduced may be repeated.

Next, position inspection is executed again (Step S52). This position inspection is similar to the position inspection of Step S32. If there is no problem in this position inspection, that is, when it is determined that the tips of the optical fibers 3a and 3b are positioned in the predetermined range, the removing operation ends, and the process proceeds to Step S34. On the other hand, in the position inspection of Step S52, when it is determined that the tips of the optical fibers 3a and 3b are not positioned in the predetermined range, the process returns to Step S51.

In the present embodiment, the clamp pressures are varied by varying the positions of the V-grooves using the base driving mechanism 56. The base driving mechanism 56 is a mechanism utilized for alignment of optical fibers and can adjust the positions of optical fibers subjected to positioning inside V-grooves. In this constitution, there is no need to separately provide a mechanism for alignment and a mechanism for varying clamp pressures, and thus a situation in which the device constitution becomes complicated is curbed.

Hereinabove, an embodiment has been described in detail with reference to the drawings. However, a specific constitution is not limited to this embodiment.

For example, a fusion splicing device for performing fusion splicing between multi-core fibers having a plurality of optical fibers has been described. However, the fusion splicing device may be a device for fusion-splicing single-core optical fibers each of which is formed of one optical fiber.

In addition, regarding an example of a removing operation, an example in which optical fibers move along V-grooves in a state in which positions of the V-grooves are fixed. However, for example, optical fibers may be relatively moved with respect to V-grooves in the axial direction by moving the V-grooves (that is, the bases) in a state in which positions of the optical fibers are fixed. In this case, the fusion splicing device may have a movement mechanism for moving the bases 11 and 12 in the extending direction (Y direction) of the V-grooves.

REFERENCE SIGNS LIST

1 Part of fusion splicing device
3, 3a, 3b Optical fiber
4 Tape core
5, 6 Electrode rod
5a, 6a Tip
11, 12 Base
16, 17 Optical fiber disposition portion
16a, 17a V-groove
21, 22 Clamp
21a, 22a Arm portion
21b, 22b Pressing portion
31, 32 Holder
31a, 32a Holder main body
31b, 32b Lid
51 Image capturing device
52 Fusion splicing mechanism
53 Clamp driving mechanism (clamp pressure varying mechanism)
54 Holder driving mechanism (movement mechanism)
56 Base driving mechanism (clamp pressure varying mechanism)
55 Display device
60 Control unit
G Foreign matter

The invention claimed is:

1. An optical fiber fusion splicing method for performing fusion splicing through positioning of optical fibers to be spliced in a V-groove, the optical fiber fusion splicing method comprising:
    pressing the optical fibers placed in the V-groove relatively toward the V-groove using a clamp;
    in a state in which the optical fibers are pressed by the clamp, varying a clamp pressure of the clamp, by changing a position of the clamp in a direction intersecting an axial direction of the optical fibers; and
    moving the optical fibers placed in the V-groove with respect to the V-groove in the axial direction,
    wherein the varying the clamp pressure and the moving the optical fibers in the axial direction are performed simultaneously,
    the varying the clamp pressure includes raising and lowering the clamp pressure, and
    the moving the optical fibers includes moving the optical fibers forward and backward in the axial direction.

2. The optical fiber fusion splicing method according to claim 1, wherein the step of varying the clamp pressure includes lowering the clamp pressure and subsequently increasing the clamp pressure.

3. The optical fiber fusion splicing method according to claim 1, wherein the step of varying the clamp pressure includes increasing the clamp pressure and subsequently decreasing the clamp pressure.

* * * * *